United States Patent [19]

Livi

[11] Patent Number: 4,824,729

[45] Date of Patent: Apr. 25, 1989

[54] DECORATIVE MIRROR AND METHOD OF MAKING IT

[75] Inventor: Vittorio Livi, Pesaro, Italy

[73] Assignee: FIAM S.r.L., Tavullia, Italy

[21] Appl. No.: 13,055

[22] Filed: Feb. 10, 1987

[30] Foreign Application Priority Data

Jul. 2, 1986 [IT] Italy .............................. 21011 A/86

[51] Int. Cl.$^4$ .......................... B32B 17/00; G02B 5/08

[52] U.S. Cl. ...................................... 428/428; 156/63; 350/600; 428/912.2

[58] Field of Search ............. 428/912.2, 428; D6/300, D6/301, 302; D11/132; 156/63; 350/102, 103, 600

[56] References Cited

U.S. PATENT DOCUMENTS

| | | | |
|---|---|---|---|
| 1,858,358 | 5/1932 | Cooper | 428/912.2 X |
| 2,549,893 | 4/1951 | Cook | 428/912.2 X |
| 4,200,359 | 4/1980 | Lawson | 428/912.2 X |
| 4,767,676 | 8/1988 | Swarovski et al. | 156/63 X |

FOREIGN PATENT DOCUMENTS

| | | | |
|---|---|---|---|
| 2145035 | 3/1985 | United Kingdom | 428/912.2 |

*Primary Examiner*—Henry F. Epstein

*Attorney, Agent, or Firm*—Birch, Stewart, Kolasch & Birch

[57] ABSTRACT

A decorative mirror made by gluing one or more glass plates onto one face of a glass sheet, and thereafter backing said face along with the plates with a reflective surface. Quite a peculiar optical effect is thus achieved because of the displacement and deformation undergone by the reflection plane defined by the surface being backed.

8 Claims, 3 Drawing Sheets

DECORATIVE MIRROR AND METHOD OF MAKING IT

DESCRIPTION

The present invention relates to a decorative mirror and a method of making it.

As is known the artistic world is ever demanding novel technical instruments to enable artists to express their creative talents in a variety of fields.

Mirrors, in particular, exert a special characteristic in the peculiar way they interact with light.

In the past (but also at present) a mirror has been treated either like an oil painting canvas or a drawing board by painting directly on its front surface. Its peculiar optical effect resulting from those areas left unpainted and, hence, reflective to light.

Another technique frequently resorted to heretofore has been the creation of mosaic structures by means of individual mirror elements which possess various colors.

A further, and surely quite ancient technique is that of providing a mirror surface with patterns by either grinding or etching processes.

More recently, a technique of silk-screening mirrors with patterns has been developed, mostly using a single color.

Still another technique which is gaining some favor is that of applying small colored and variously shaped glass plates over a mirror front surface.

An object of the present invention is to provide a novel method of making decorative mirrors, which can be instrumental to the artist in his effort for achieving new aesthetic effects.

This object is achieved, according to the present invention, by a method which comprises the following steps:

gluing a glass plate over one face of a glass sheet; and backing said face along with said plate.

For backing, manual spray application may be dictated by the thickness of the applied plates, thereby forbidding the use of automatic equipment.

The method yields an artistic mirror having a highly peculiar optical effect which originates from dislocation and deformation of the reflecting plane (as defined by the backed surface) at each glued-on plate. This optical effect, which becomes especially evident and detectable in the instance where the plates are colored, opens up to the artist many new creative ways.

A mirror made with the method of the present invention will be next described with reference to the accompanying drawings.

Figure 1:
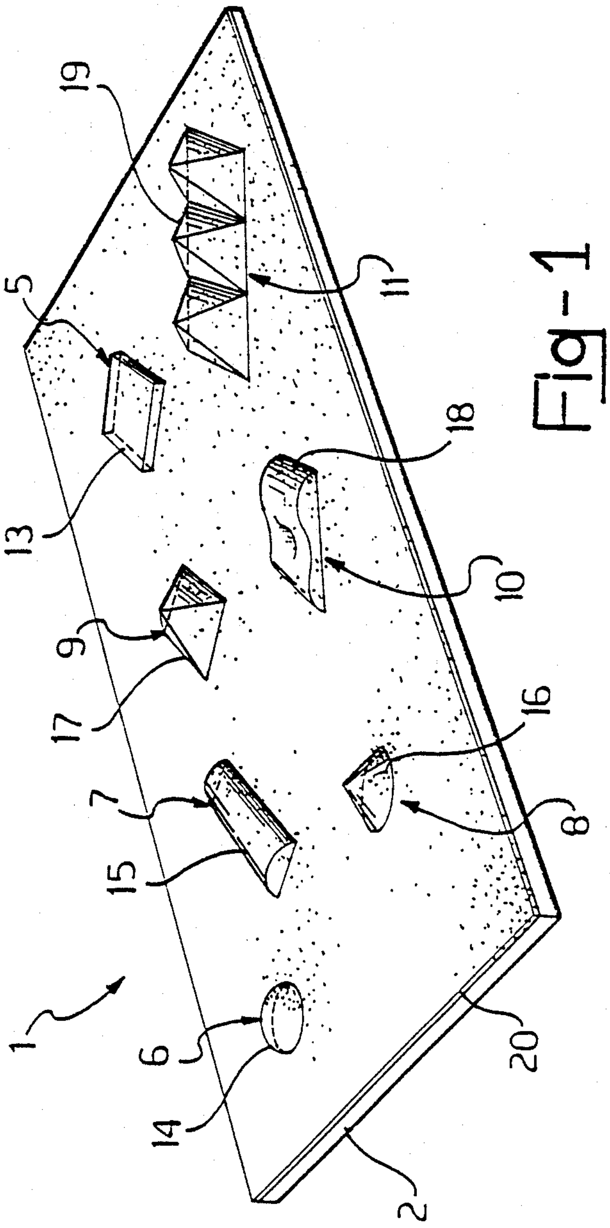
FIG. 1 is a perspective rear view of a mirror made with the method according to the present invention.
Figure 2:
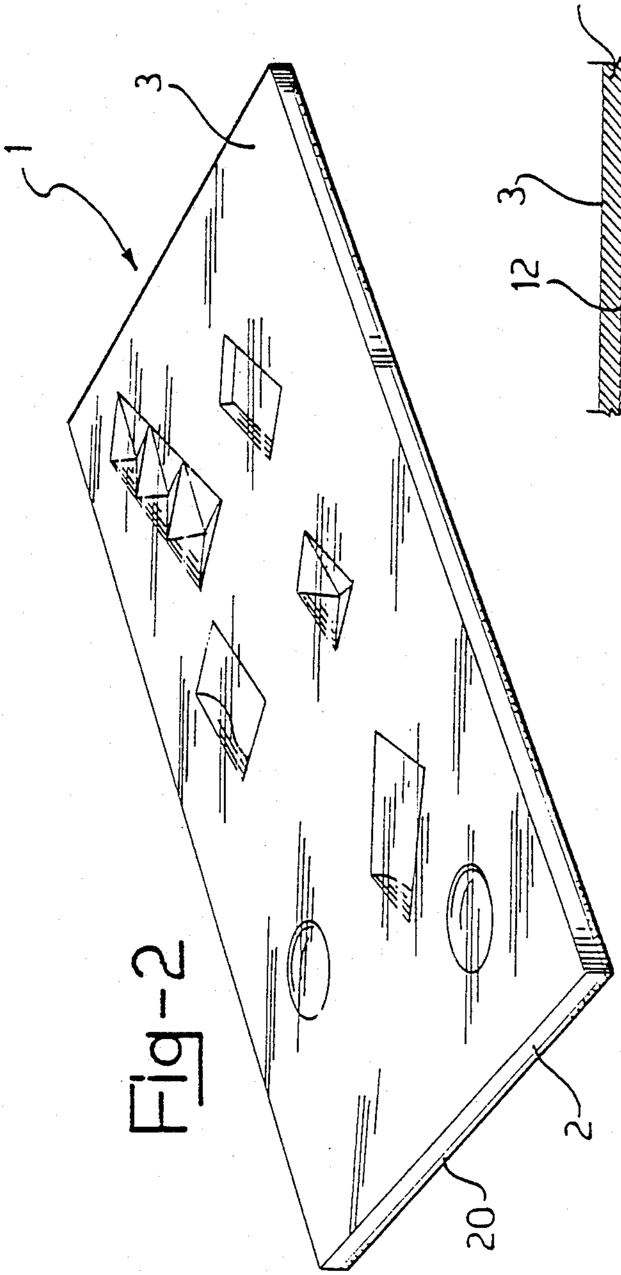
FIG. 2 is a front view in perspective of the mirror of FIG. 1.

In the drawings, the numeral 1 designates generally a decorative mirror comprising a sheet 2 of plate glass (or of crystal glass) which has a front face 3 and a back face 4, which are flat and parallel to each other.

Figure 3:
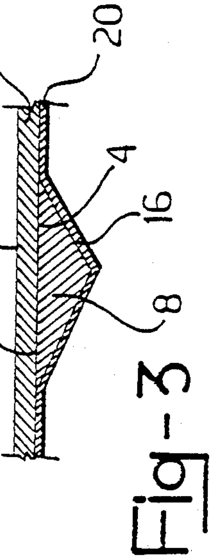
FIG. 3 is a sectional detail view of the mirror of FIG. 1, taken along Line III—III of FIG. 1.

The back face 4 of the sheet 2 is provided with a plurality of glass (or crystal glass) plates, in particular seven such plates respectively indicated at 5,6,7,8,9,10 and 11, all of which having a flat front surface 12 (shown in FIG. 3 is surface 12 relating to the plate 8), which is glued to the back face 4 of the sheet 2 in a manner known per se, such as by the use of polyvinyl butylate or some other suitable clear cement.

The plates may have any shape suiting the artist's preference; such as for example, the plates 5–11 are shown to have substantially geometric shapes. More precisely, the plate 5 is sheet-like flat and has a flat back surface 13; the plate 6 is fashioned after a segment of a sphere and has a back surface 14 of spherical shape; the plate 7 is a segment of a cylinder and has a back surface 15 of cylindrical shape; the plate 8 is conical and has a back surface 16 of conical shape; the plate 9 is pyramid-like and has a back surface 17 of pyramidal shape; the plate 10 has a generally rounded back surface 18; and the plate 11 has its back surface 19 generally faceted.

The back face 4 of the sheet 2 is coated, along with the back surfaces 13–19 of the plates 5–11, with a backing layer or foil 20 constituting the reflective surface of the mirror 1.

A modification of the method according to the present invention envisages that plural plates be superimposed upon one another prior to backing. Of course, the back surface of each intermediate plate would, in this case, have to mate perfectly with the front surface of the next plate. Preferably the intermediate plates would be at least in part sheet-like.

Figure 4:
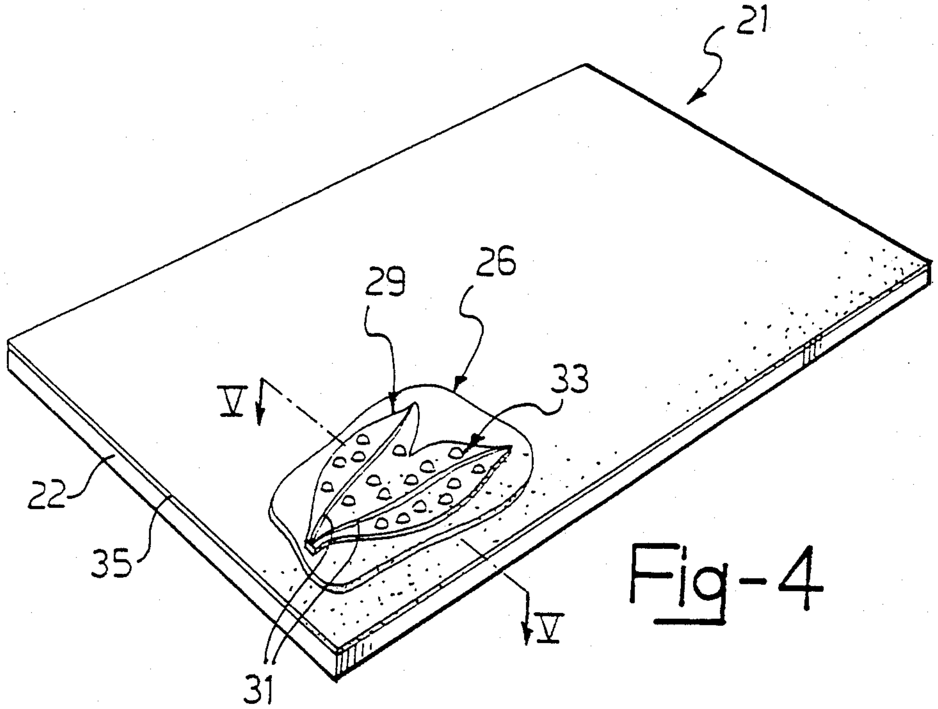
FIG. 4 is a perspective rear view of a mirror made with a modification of the present inventive method.
Figure 5:
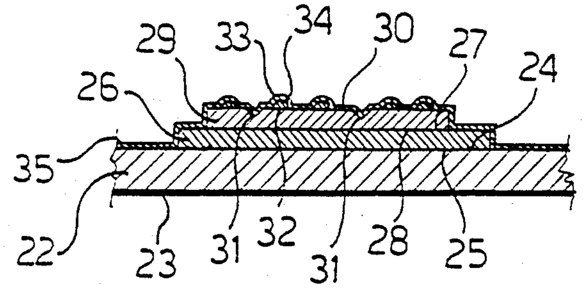
FIG. 5 is a sectional detail view of the mirror of FIG. 4, taken alone Line V—V of FIG. 4.

A mirror 21 obtained with this modified method is shown in FIGS. 4 and 5. The mirror 21 comprises a sheet 22 of plate glass (or crystal glass) having a front face 23 and a back face 24 which are flat and parallel to each other.

Glued to the back face 24 is a flat front surface 25 of a sheet-like plate 26; the plate 26 has a flat back surface 27 onto which a flat front surface 28 of a sheet-like plate 29 is glued; the plate 29 has its flat back surface 30 formed with straight line impressions 31 and carrying the flat front surfaces 32 glued thereon of round-shape plates 33 which have a convex back surface.

The back surface 24 of the sheet 22 is coated, along with the plates 26, 29 and 33, with a backing layer 35 which constitutes the reflective surface of the mirror 21.

As may be appreciated from the foregoing description and the drawings, a mirror according to the present invention can provide optical effects which are quite new and peculiar; such effects can only be detected, of course, on viewing the mirror directly, and cannot be reproduced in a drawing, even in an approximate way, being more in the nature of light rays than well-defined image deformations.

It should be also noted that a decorative mirror according to the invention is apt to retain its aesthetical characteristics over time without undergoing any deterioration due to dust or generic dirt deposits. In fact, it perfectly smooth and continuous front face presents no recesses wherein dust can collect.

I claim:

1. A method for making decorative mirrors comprising a glass sheet having a substantially flat front face and a substantially flat back face and containing at least one glass plate having any desired configuration and containing as a front face at least one flat surface, and a back face which comprises the steps of gluing the front flat surface of the glass plate to the back face of the glass sheet and coating the back face of the glass sheet and the back face of the glass plate with a backing layer constituting the reflective surface of the mirror.

2. The method of claim 1 wherein a plurality of glass plates having a variety of geometric configurations are glued to the back face of the glass sheet.

3. The method of claim 1 wherein the glass sheet includes a plurality of glass sheets which are glued together.

4. The method of claim 1 wherein the glass plate is formed from colored glass.

5. A decorative mirror which comprises a glass sheet having a substantially flat front face and a substantially flat back face at least one glass plate having a flat front face and a back face with any desired configuration, said glass plate being glued by its flat front face to the back face of the front sheet, and a backing layer coating the back face of the glass sheet and the back face of the glass plate, said backing layer constituting the reflective surface of the mirror.

6. The decorative mirror of claim 5 wherein a plurality of glass plates are glued to the back face of the glass sheet.

7. The decorative mirror of claim 5 wherein a plurality of glass sheets are placed together.

8. The decorative mirror of claim 5 wherein the glass plate is formed from colored glass.

* * * * *